June 18, 1929.  R. L. VILAS  1,717,478
MIXING TANK
Filed June 9, 1926
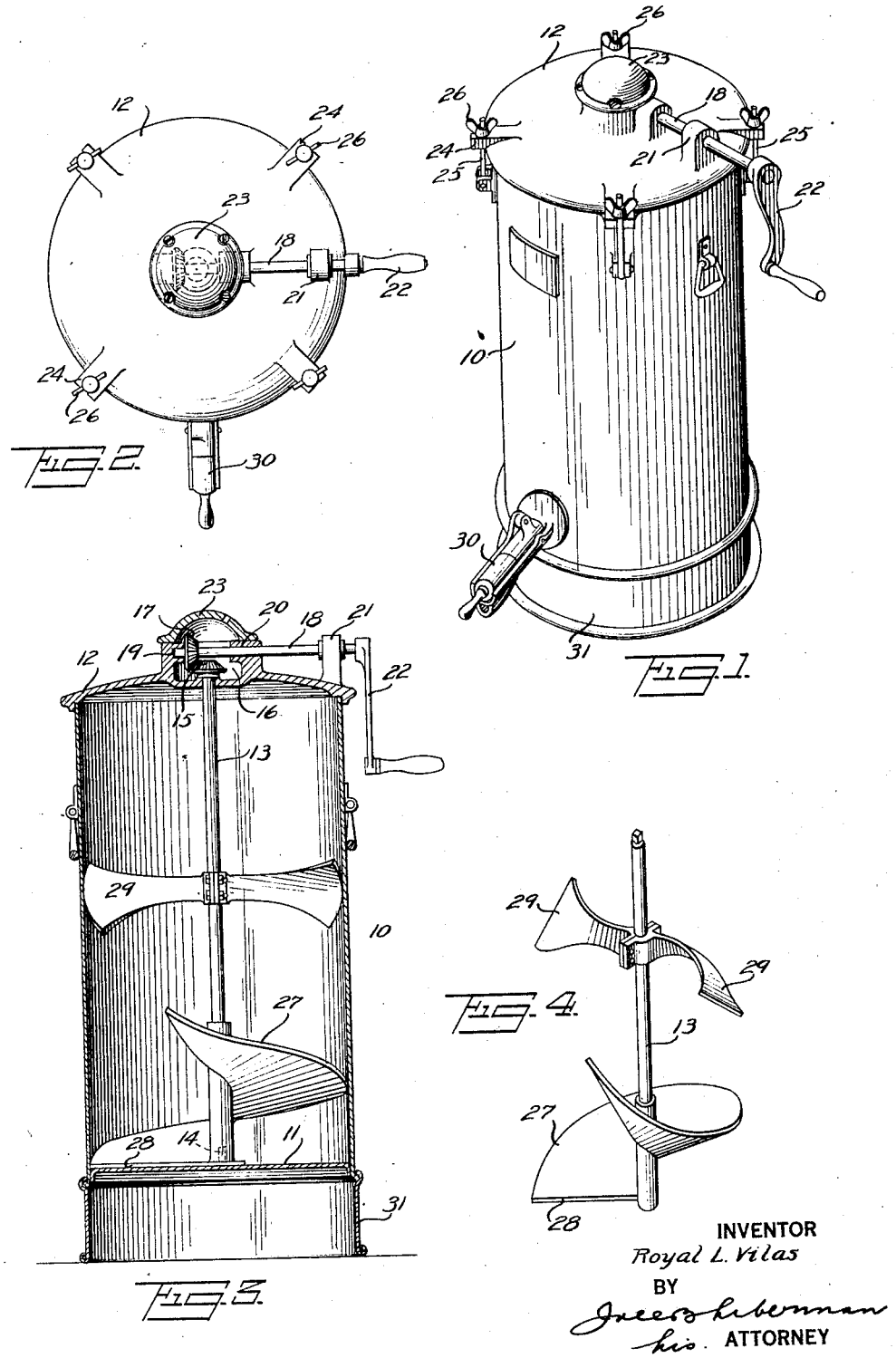
INVENTOR
Royal L. Vilas
BY
his ATTORNEY Patented June 18, 1929.

1,717,478

UNITED STATES PATENT OFFICE.

ROYAL L. VILAS, OF NEW HAVEN, CONNECTICUT.

MIXING TANK.

Application filed June 9, 1926. Serial No. 114,649.

The present invention relates to mixing tanks and is more particularly directed toward a form of tank suitable for use in mixing lacquers, enamels, paints and the like.

Materials of the nature of which these mixing tanks are to be used have a tendency to separate into layers on account of the specific gravity of the ingredients, and the present invention contemplates a mixing tank suitable for containing a supply of these materials and provided with a stirring means so that one may easily agitate the contents of the tank sufficiently to make it become homogeneous and uniform throughout. The tank is provided with a removable cover which prevents evaporation and the entrance of dust, and also with a spout for withdrawing the contents of the tank as desired.

An object of the present invention is to provide a tank with an improved arrangement of stirring paddles preferably arranged in the form of a helical worm or screw so as to stir and mix the contents of the tank and scrape the contents off the tank bottom.

A further object of the invention is to provide a tank for these purposes having a readily removable cover provided with a hand crank and gears for driving the vertical shaft which carries the agitating devices.

The accompanying drawings show for purposes of illustration, one of the many possible embodiments in which the present invention may take form, it being understood that the drawings are illustrative of the invention rather than limiting the same.

In these drawings:

Figure 1 is a perspective view of the mixing tank;

Figure 2 is a top plan view of the tank;

Figure 3 is a vertical sectional view through the tank; and

Figure 4 is a detached view illustrating the stirring mechanism.

A cylindrical steel drum 10 is provided with a permanently closed bottom 11 and with a removable cover 12. As here shown the cover and bottom are provided with bearings and a centrally placed vertical shaft 13. The bearing in the bottom is in the form of a pin 14 which enters into a recess in the lower end of the shaft 13, while the upper end of the shaft 13 passes through a hole in the cover and is provided with a bevel gear 15. The cover is also provided with a chamber 16 to house a second bevel gear 17 in mesh with the gear 15. The gear 17 is mounted on a horizontal shaft 18 suitably carried in bearings 19 and 20 in the side walls of the chamber 16. The shaft 18 also passes through a bearing member 21 supported near the side of a cover 12 and a hand crank 22 is provided for turning the shafts 18, gears and shaft 13. A removable cap 23 covers the gear box.

The cover 12 is provided with a number of bifurcated lugs 24 which extend beyond the side wall of the tank 10 and the wall of the tank is provided with the same number of clamping bolts 25 so that the cover may be clamped in place by tightening up on the wing nuts 26 carried on the clamping bolts. The shaft 13 is provided with a suitable stirring mechanism for the purpose of mixing or agitating the contents of the tank as well as scraping the heavier materials off the bottom of the tank.

As here shown, the lower stirrer 27 is in the form of a worm or helical shaped member having a lower edge 28 adapted to scrape material from the bottom of the tank. This scraping member extends as shown, through slightly more than the circumference. It is of comparatively steep pitch so that the material scraped off the bottom of the tank is carried toward the upper part of the tank. Additional stirring paddles 29 may be attached to the shaft 13 by bolting them in place as indicated. The number of the additional paddles used will depend upon the depth of the tank and the amount of material with which is is customarily filled.

To stir or agitate the contents of the tank, it is necessary to give the handle a few turns which are very effective on account of the shape of the stirrers which not only scrape the bottom of the tank but elevate the heavier material a considerable distance. The stirrers are preferably made so that their outside diameter is almost equal to the inside diameter of the tank.

The tank may be provided with any form of delivery spout as indicated at 30, and the entire tank may be mounted on a suitable base 31. The top, the worm, the stir or paddles are preferably made of cast aluminum to reduce the weight. By using the present form of tank, it is possible to eliminate evaporation which is unavoidable where the open containers are used. It reduces the hazard and makes it possible to have a more uniform mixture. It also makes it possible for one to mix materials according to any particular formula and to obtain any color desired.

The materials are put into the tank, the cover fastened on and the contents agitated so as to bring about uniformity.

It is obvious that the invention may be embodied in many forms and constructions, and I wish it to be understood that the particular form shown is but one of the many forms. Various modifications and changes being possible, I do not limit myself in any way with respect thereto.

I claim:

1. A mixing tank comprising a container; a single vertical shaft rotatably mounted in the container; and a helically shaped stirrer of comparatively steep pitch carried by the lower end of the shaft and extending substantially through one complete turn, the lower edge of the stirrer engaging the bottom of the tank whereby all of the material resting upon the bottom of the tank will be scraped therefrom during each revolution of the shaft, and the diameter of the stirrer throughout being substantially the same as the inside diameter of the container whereby none of the material taken up by the stirrer will be permitted to spill over the peripheral edge thereof.

2. A mixing tank comprising a container; a single vertical shaft rotatably mounted in the container; a helically shaped stirrer of comparatively steep pitch carried by the lower end of the shaft and extending substantially through one complete turn, the lower edge of the stirrer engaging the bottom of the tank whereby all of the material resting upon the bottom of the tank will be scraped therefrom during each revolution of the shaft, the diameter of the stirrer throughout being substantially the same as the inside diameter of the container whereby none of the material taken up by the stirrer will be permitted to spill over the peripheral edge thereof; and an auxiliary stirrer comprising a pair of oppositely disposed inclined radial paddles mounted on the shaft above the lower stirrer.

Signed at Bridgeport, in the county of Fairfield, and State of Connecticut, this 2nd day of June, 1926.

ROYAL L. VILAS.